May 3, 1938.　　　　J. SIVERTSEN　　　　2,116,221
APPARATUS TO AUTOMATICALLY DETERMINE THE ANGULAR
POSITION OF UNBALANCE IN ROTATABLE BODIES
Filed Aug. 31, 1935
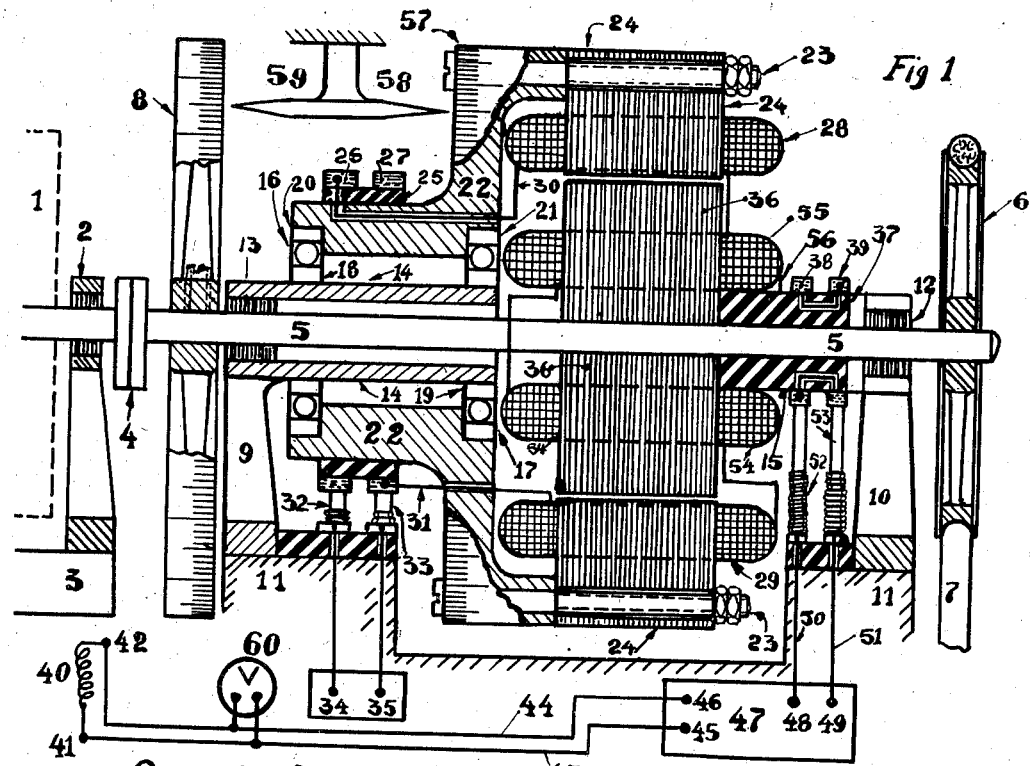
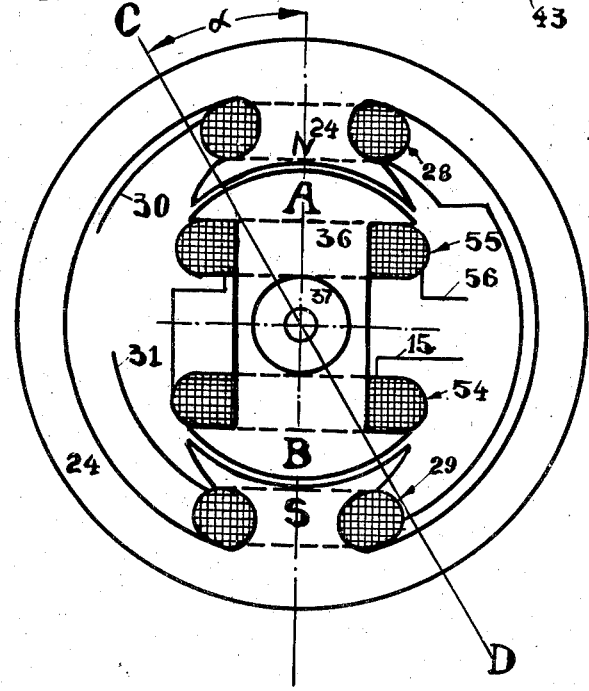
INVENTOR.
Jens Sivertsen Patented May 3, 1938

2,116,221

UNITED STATES PATENT OFFICE 2,116,221

APPARATUS TO AUTOMATICALLY DETERMINE THE ANGULAR POSITION OF UNBALANCE IN ROTATABLE BODIES

Jens Sivertsen, Philadelphia, Pa.

Application August 31, 1935, Serial No. 38,710

9 Claims. (Cl. 73—51)

For high speed balancing of rotatable bodies, such as armatures for electrical motors, crankshafts for gasoline motors, and other rotatable bodies in mass production, means have been developed, which will give an indication of the amount of unbalance by the reading of an electrical meter.

The devices previously used can be designated as half-automatic, as the angular position had to be found by tuning a dial, or by stroboscopic or other auxiliary devices.

A machine which automatically will also give the angular position of the unbalance will increase the speed of production very much, and be a true automatic balancing machine.

This invention is not in any way concerned with how the amount of unbalance is found, as this invention can be utilized together with any devices to determine the amount of unbalance.

It will however be very easily adaptable to means whereby the amount is found automatically by reading of a current through an electrical meter, as commonly known.

The device comprises a rotor carrying magnets, which is positively driven, and is secured to revolve with the body, the direction of the angular unbalance of which is to be determined, so that the two will rotate together. It comprises also a carrier free to move angularly with reference to the rotor and also carrying magnets. This carrier is preferably a rider rotatable with an axis that coincides substantially with the axis of revolution of the rotor. One of these two elements—rotor and carrier—carries magnets that are of a fixed polarity and the other of them carries magnets of alternating polarity, the magnets of alternating polarity are excited by the alternating current caused by the vibrations arising from the rotation of. the body, the angular position of unbalance of which was to be determined. The word "magnet" is used in its broad sense and includes permanent magnets and solenoids excited by alternating as well as direct currents. The magnets of the carrier and the rotor are arranged so that those of one of these elements is free to pass the poles of the other. Where the magnets excited by the alternating currents are placed on a rotor and the latter is rotated synchronously with the alternations of the current, each pole alternates in its polarity and each pole is most strongly magnetized when at one angular position, which is decided by the angular position of the unbalance. (A like condition occurs where the alternating coils are placed on the carrier if the alternations of current are produced by the forces arising from the unbalance of the body, at which position it will always have the same polarity.) If a carrier carrying the magnets of fixed polarity is free to move angularly it will adjust itself to move into this angular position and a carrier carrying alternating coils will act similarly. From this the angular direction of the unbalance can be read, directly by a suitable scale or by other means. In my present device, the vibrations produced by the unbalance of the body tested are usually sufficient to produce an alternating current through the rotated magnets.

For the purpose of illustrating the invention, I have shown in the accompanying drawing a typical embodiment of it, which in practice, will give reliable and satisfactory results. This drawing and its description in this specification are not to be taken, however, as limiting my invention to the construction shown therein. This embodiment while the best form of my device of which I am at present aware is typical only, and the various instrumentalities of which my invention consists can be variously arranged and organized, and the invention is not limited to the precise arrangement and organization as set forth.

Fig. 1 is an elevation partly in section of my device, Fig. 2 is an end elevation also partly in section and partly schematic. 1 is the body to be balanced supported by a bearing 2, which is part of a cradle 3, or any other arrangement allowing the unbalanced forces to excite an electric pick up unit in such a manner that an alternating electric voltage, synchronous with the vibration of the body to be balanced will result from this excitation—as commonly known in the art. 4 is a coupling preferably a universal joint whereby body 1 is rotated by the shaft 5 which in turn is rotated by a pulley 6, driven by a belt 7, from a motor or in any other way. 8 is a graduated drum which by a set-screw, pin, or in any other way can be fastened to the shaft 5. 9 and 10 are two brackets rigidly fastened to a frame 11. In bracket 10 is drilled a hole wherein the sleeve-bearing 12 is inserted to support the shaft 5. In bracket 9 is in the same manner inserted the sleeve 13, which also acts as a sleeve-bearing for shaft 5. The outside surface of the upper portion of the bracket 9 is concentric with the hole in which the sleeve 13 is inserted and is turned in a lathe to give a smooth circular surface 14. The two ball-bearings 16 and 17 are supported on this surface with their inside rings 18 and 19. The outside rings 20—21 of the ball-bearings carry the circular carrier 22. The outside of this carrier may carry also the scale which may be graduated at 57 like the drum 8.

A stack of field laminations 24 is fastened to the carrier 22 by the screw bolts 23.

The insulating ring 25 carries two slip rings 26 and 27 that are insulated from each other. These three rings form a solid structure and are rigidly fixed to the carrier 22.

The laminations 24 carry the two field coils 28 and 29. These coils may be regarded as one coil as they are connected directly in series. The terminals 30 and 31 of this coil are connected to the slip-rings 26—27 respectively and the latter are in contact with the brushes 32 and 33 respectively that are connected electrically with a source of direct current having the terminals 34 and 35. If 34 is the plus side a current will pass from 34 to brush 32, slip-ring 26, coil terminal 30 to coil 28—29; from coil to terminal 31, slip-ring 27, brush 33 and to the other terminal 35, thus completing the circuit. The carrier 22 with the laminations, coils, and slip-rings is a rider riding freely on an axis that is coaxial with the axis of shaft 5. On shaft 5 are rigidly fixed rotor laminations 36, and the insulating ring 37. To the rotor laminations are fixed the coils 54—55 connected in series. Their terminals 15—56 are connected to the slip-rings 38—39 which are insulated from each other and are fastened to the insulating ring 37. When shaft 5 is rotated by pulley 6 the body 1 to be balanced, the armature 36 with coils, slip-rings 38 and 39, the insulating ring 37, will all rotate with the shaft. The carrier 22 and the parts carried by it, are free to seek their own angular position around the same axis and do not have to rotate with shaft 5.

When the body to be balanced is rotating it will by its unbalanced forces create an alternating electric current designated diagrammatically through some kind of a pick up arrangement designated diagrammatically by coil 40, if the cradle or support is so arranged. This pick up may be electromagnetically or electrostatically arranged, or be arranged in such a manner that the properties of piezo electric crystals are utilized—as commonly known in the art. The phase angle of this current relative to shaft 5 and drum 8 is decided by the angular position of the unbalance, as well known in the art. The terminals of the pick up arrangement are the insulated points 41 and 42. The insulated wires 43 and 44 conduct this generated pick up current to the input terminals 45 and 46 of a vacuum tube amplifier 47. From the output terminals 48 and 49 of this amplifier the amplified current, containing much more energy than the input, passes through insulated wires 50 and 51 and is conducted through the brushes 52 and 53, which are contacting the slip-rings 38 and 39 to the coils.

When an unbalance is present in the body to be balanced I will therefore get an amplified alternating current and voltage from the output terminals of the amplifier 47 from 48 through 50 to brush 52, slip-ring 38 armature coil 54—55, slip-ring 39, brush 53, wire 51 to 49, thus completing the circuit. The phase angle of this current is dependent on the angular position of the unbalance.

For a further understanding of the workings of the arrangement I will turn to the schematic end view Figure 2.

The same designations as in Figure 1 are used.

Figure 2 shows the armature lamination 36 with its coil 54—55 and terminals 15 and 56. These terminals are connected to slip-rings 38 and 39 as previously outlined and shown in Figure 1.

The outside stack of laminations 24, with its coil 28—29 has the terminals 30 and 31 that are, as explained connected to slip-rings 26 and 27.

The coil 28—29 which is supplied with direct current through its terminals 30 and 31, will give the outside stack of laminations a distinct magnetic polarity. I assume this polarity to be a north pole at the side designated N and a south pole at the side designated S.

The inside stack of laminations 36 will not have a certain polarity as the coil is supplied with alternating current. It will therefore change its polarity once every cycle. Once every cycle it will have a north pole at A and once at B and once every cycle it will have a south pole at B and once at A. The strength of these poles will also continually vary with the supplied alternating current.

The armature 36 with its coil 54—55 is at the same time rotating synchronously with the rotating body.

If I assume that at an angle α from the vertical plane I get the maximum strength of a south pole at A, and at B a north pole, I will half a rotation after, when B is near C and A near D, have a south pole in the B end and a north pole in the A end.

This means that the maximum strength of the north pole will always occur in the same relative position to the vertical plane, and so will the south pole.

As the magnetic field lines always strive to shorten themselves as much as possible, and as the coil 28—29 with laminations 24 is free to move around the ball-bearings 16 and 17, Figure 1 and thus take any angular position, the coil with laminations 24 will turn to take the angular position that will give it in average the shortest field lines.

The pole N of 24 will therefore move over to C and S to D and take the angular position α thus indicating the position where the amplified unbalance current is the strongest, thus enabling the operator to read the angular position of the unbalance on the graduations 57 by reference to the pointer 58. By turning the pulley 6 after the motor has been stopped, until the pointer 59 points at the same number on the drum 8—as the pointer 58 points at, on the scale 57, the operator has found the unbalance to be at that angle, relative to his selected zero point.

If in addition, the arrangement is provided with a sensitive meter 60, the operator will when the machine is running also have means to read directly the voltage created by the unbalanced forces and thus simultaneously have an indication of the amount of unbalance.

The amplifier should also have a phase distortion not changing with the input signal. Resistance- or transformer-coupling between the tubes will give the best results. Choke coupling gives a slight error.

The arrangement as set forth may be varied in different ways.

I have shown the rotated field excited by the alternating current and the other field by the direct current, but my invention can be practiced where the rotating field is supplied with direct current and the other field is supplied with alternating current. The only change required is to reverse the connections to rings 26, 27, and 38, 39. The direct current coil with its lamination as shown in Figures 1 and 2 can also be replaced by a permanent magnet instead of the coil with lamination and slip-rings.

In the outlined arrangement the armature 36 and the body to be balanced I are mechanically connected to give synchronous rotation. I do not, however, limit myself to these means of connecting it.

It should also be possible to do away with the vacuum tube amplifier for special applications where the electric energy resulting from the unbalanced forces is big enough and the outlined electromagnetic arrangement can be built light enough to indicate for a small energy.

It is also possible to do away with the steel laminations in the magnetic paths in applications where the bearing friction can be made small enough or where the applied currents are strong enough and generally I do not limit myself to the form of device set forth which is the best form of which I am at present aware, as many changes may be made without departing from my invention.

Having thus described my invention, what I claim as new, and what I wish to secure by Letters Patent is:—

1. An electromagnetic device to automatically locate the angular position of unbalance in rotatable bodies comprising a coil rotating synchronously with the body to be balanced and supplied with alternating current from the body to be balanced, means activated by the vibrations of said body for supplying said alternating current, an outside permanent magnetic ring, supported concentric with the rotating coil but free to seek its own angular position.

2. An electromagnetic device to automatically locate the angular position of unbalance in rotatable bodies consisting of a rotor carrying a coil rotating synchronously with the body to be balanced, supplied with alternating current originating from body to be balanced, electric means operated by the vibration of said body supplying said alternating current, a carrier, mounted coaxially with said rotor and carrying a second coil, supplied with direct current, said carrier being free to seek its own angular position.

3. An apparatus for determining the angular position of the unbalance in a rotatable body, comprising a positively driven rotor, and a carrier, free to turn on the same axis as the rotor, one of these two elements carrying magnets of fixed polarity and the other of said elements carrying coils of alternating polarity, the poles of said magnets of fixed polarity being revolvable to be opposite the positions of greatest strength of the coils of alternating polarity, means for rotating the said body synchronously with said rotor, and means for producing in the coils of alternating polarity, alternating currents generated by the unbalanced forces in said body, synchronous with the revolutions of the rotor and said body, said carrier being free to seek its own angular position.

4. An apparatus to determine the angular position of unbalance in rotatable bodies, consisting of means consisting of a rotor rotated synchronously with the body to be balanced, a second means consisting of a rider rotatable coaxially with said rotor and, free to seek any angular position relative to a pre-determined zero point, one of said means having a fixed polarity and a device for supplying the other of said means with an alternating current originating from the unbalanced forces in the body to be balanced.

5. An electromagnetic device to automatically locate the position of unbalance in rotatable bodies, comprising two instrumentalities, namely, a rotor and a carrier, each instrumentality carrying coils and being mounted coaxially with the other, the rotor being rotated synchronously with the body to be balanced and the carrier being free to seek its own angular position, a pick up mechanism whereby the forces due to unbalance are changed into an alternating voltage, and electrical conducting means between the pick up mechanism and one of said instrumentalities.

6. An electromagnetic device to locate automatically the angular position of unbalance in a rotatable body, consisting of two coaxially rotatable elements, each carrying coils, one of said elements being rotated synchronously with said body, and the other of them being free to seek its own angular position, the coils of one element being of constant polarity, and means for supplying the coils of the other with alternating current originating from the unbalance.

7. An electro-magnetic device to automatically locate the angular position of unbalance in rotatable bodies, comprising electrical pick up means excited by the vibrations of said body to be balanced, a coil rotating synchronously with said body to be balanced, said coil supplied with alternating current from said pick up means, an exterior carrier carrying a coil, said coil supplied with direct current, said carrier supported coaxially with said rotating coil, but free to seek its own angular position.

8. An apparatus for determining the angular position of unbalance in a rotatable body, comprising a rotor and a carrier, said rotor rotated synchronously with said body to be balanced, said rotor having a coil and means for producing in said coil alternating current generated by the unbalanced forces in said body to be balanced, said carrier having a magnet, said carrier supported coaxially with said rotor, but free to seek its own angular position.

9. An apparatus to determine the angular position of unbalance in a rotatable body, comprising electrical pick up means generating alternating voltage by the vibrations due to unbalance in said body, a rotor and a magnet, said rotor having a coil, said coil supplied with alternating current originating in said pick up means, means to support said magnet coaxially with said rotor, but free to seek its own angular position.

JENS SIVERTSEN.